United States Patent
Sutter et al.

(10) Patent No.: US 10,935,062 B2
(45) Date of Patent: Mar. 2, 2021

(54) METHOD FOR PRODUCING AN ASSEMBLY

(71) Applicant: Bayerische Motoren Werke Aktiengesellschaft, Munich (DE)

(72) Inventors: Nathanael Sutter, Hoehenkirchen (DE); Andreas Luger, Hohenwarth (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 217 days.

(21) Appl. No.: 15/995,862

(22) Filed: Jun. 1, 2018

(65) Prior Publication Data
US 2018/0274576 A1 Sep. 27, 2018

Related U.S. Application Data
(63) Continuation of application No. PCT/EP2016/077917, filed on Nov. 17, 2016.

(30) Foreign Application Priority Data
Dec. 2, 2015 (DE) .................. 10 2015 223 962.4

(51) Int. Cl.
F16B 11/00 (2006.01)
F16B 7/04 (2006.01)

(52) U.S. Cl.
CPC ............ F16B 11/006 (2013.01); F16B 7/048 (2013.01)

(58) Field of Classification Search
None
See application file for complete search history.

(56) References Cited

U.S. PATENT DOCUMENTS

| 6,058,673 A | 5/2000 | Wycech |
| 2007/0051465 A1* | 3/2007 | Naughton ............... B29C 65/54 156/305 |

FOREIGN PATENT DOCUMENTS

| CN | 1218529 A | 6/1999 |
| CN | 1859996 A | 11/2006 |
| CN | 101128355 A | 2/2008 |
| DE | 195 38 803 A1 | 4/1996 |
| DE | 101 18 791 A1 | 2/2003 |
| DE | 697 20 438 T2 | 2/2004 |
| DE | 10 2014 002 612 B3 | 8/2015 |
| WO | WO 97/43501 A1 | 11/1997 |

(Continued)

OTHER PUBLICATIONS

Chinese Office Action issued in Chinese counterpart application No. 201680047907.0 dated Mar. 1, 2019, with English translation (Eighteen (18) pages).

(Continued)

Primary Examiner — Matthew J Daniels
Assistant Examiner — Paul Spiel
(74) Attorney, Agent, or Firm — Crowell & Moring LLP

(57) ABSTRACT

A method for producing an assembly including at least three components includes producing an intermediate assembly from a first component, a second component, and a third component, where the three components are arranged in a predefined position relative to each other. A first adhesive connection is produced between the second component and the third component. A second adhesive connection is produced between the first component and the second component.

1 Claim, 2 Drawing Sheets

(56) References Cited

FOREIGN PATENT DOCUMENTS

WO      WO 98/55771 A1    12/1998

OTHER PUBLICATIONS

PCT/EP2016/077917, International Search Report dated Feb. 7, 2017 (Two (2) pages).
German Search Report issued in German counterpart application No. 10 2015 223 962.4 dated Oct. 7, 2016, with Statement of Relevancy (Seven (7) pages).
Chinese Office Action issued in Chinese application No. 201680047907.0 dated Apr. 27, 2020 (Eight (8) pages).

\* cited by examiner

METHOD FOR PRODUCING AN ASSEMBLY

CROSS REFERENCE TO RELATED APPLICATIONS

This application is a continuation of PCT International Application No. PCT/EP2016/077917, filed Nov. 17, 2016, which claims priority under 35 U.S.C. § 119 from German Patent Application No. 10 2015 223 962.4, filed Dec. 2, 2015, the entire disclosures of which are herein expressly incorporated by reference.

BACKGROUND AND SUMMARY OF THE INVENTION

The present invention relates to a method for producing an assembly which is realized from at least three components.

In contemporary automobile manufacture, a reduction in the overall weight is pursued in order to reduce consumption and emission values to a minimum. In this case, new materials are used which are lighter than the metals used up to now. In particular, the use of plastic materials lends itself to realizing body parts such as, for example, doors, mudguards, rooves, etc. Fiber-reinforced plastics materials are used to achieve characteristics that are mechanically superior. Such plastics materials comprise a matrix produced from a thermosetting or also thermoplastic material, in the interior of which reinforcing fibers, in particular carbon fibers or glass fibers, are embedded.

Cold joining techniques such as riveting, screw-connecting, etc., are suitable for connecting such components. Over and above this, the components can also be bonded together in industrial production. In particular, the bonding of assemblies with multiple components has its difficulties, as a certain sequence of components to be bonded has to be adhered to here. As an alternative to this, the components can also be bonded at the same time, with geometrically complex adhesive seams, however, being produced. The more complex the geometry of the adhesive seam, the more difficulties the process-reliable bonding has, as the risk of inclusions or incomplete bonding is high.

It is the object of the present invention to provide a method with which the disadvantages of the prior art are overcome. It is a special object of the present invention to provide a method for producing an assembly which is distinguished by high process reliability.

To achieve the object, the invention teaches a method for producing an assembly, the assembly including at least three components, the method having the acts of:

producing an intermediate assembly from a first component, a second component and a third component, wherein the three components are arranged in a predetermined position with respect to one another;

producing a first adhesive connection between the second component and the third component; and producing a second adhesive connection between the first component and the second component.

Particularly process-reliable bonding can be produced as a result of producing an adhesive connection in a two-step method.

In addition, when producing the intermediate assembly, a cavity can be created between the components. The cavity includes a first region, which extends substantially between the second component and the third component, and a second region, which extends substantially between the second component and the first component. In the context, substantially means that the first region and the second region are not necessarily separated discreetly from one another, but can also merge into one another in edge regions.

In addition, the second component can include a breakthrough, wherein to produce the first adhesive connection, an adhesive can be introduced into the first region of the cavity through the breakthrough. In an advantageous manner, the adhesive can consequently be supplied on a first side of the assembly, wherein the first adhesive connection is realized in the region of a side which is remote from the first side of the component.

In addition, the first component can include a breakthrough, an adhesive being introduced into the second region of the cavity through the breakthrough to produce the second adhesive connection. Here too, an adhesive connection can be produced in the interior of the assembly advantageously via an access on one side of the assembly.

To produce the assembly, first of all the first adhesive connection can be produced, and then the second adhesive connection. The risk of air inclusions in the adhesive connection is advantageously reduced.

The first region of the cavity can be located on a side of the second component which is remote from the first component. The second region of the cavity can be located on a side of the second component which faces the first component.

In a further alternative embodiment, the first component described previously, and the third component can be realized integrally or in one piece. A method for producing such an assembly with at least two components includes the acts of:

producing an intermediate assembly from a first component and a second component, wherein the components are arranged in a predetermined position with respect to one another;

producing a first adhesive connection between a first portion of the first component and the second component; and producing a second adhesive connection between a second portion of the first component and the second component.

In the method according to the embodiment, when producing the intermediate assembly, a cavity is also created between the components, which cavity includes a first region, which extends substantially between the first portion of the first component and the second component and includes a second region which extends substantially between the second portion of the first component and the second component.

The first adhesive connection can be produced in the first region of the cavity and the second adhesive connection can be produced in the second region of the cavity.

In the method too, the second component has a breakthrough, wherein to produce the first adhesive connection, an adhesive is introduced into the first region of the cavity through the breakthrough.

Over and above this, the first component includes a breakthrough, wherein to produce the second adhesive connection, an adhesive is introduced into the second region of the cavity through the breakthrough.

In a preferred manner, first of all the first adhesive connection is produced and then the second adhesive connection is produced.

The first region of the cavity is located on a side of the second component which is remote from the breakthrough of the first component.

The invention is to be explained in more detail below by way of the description of the Figures. The description, the claims and the drawings demonstrate a plurality of features which an expert would also consider in other combinations in order to adapt the invention to corresponding applications.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
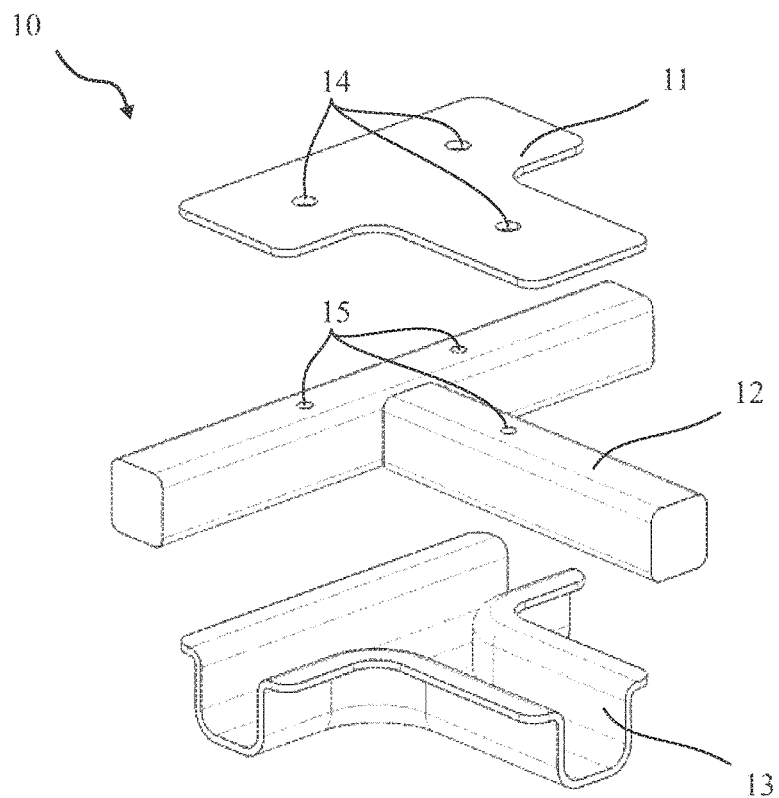
FIG. 1 shows a schematic representation of a perspective view of an assembly as an exploded drawing.
Figure 2:
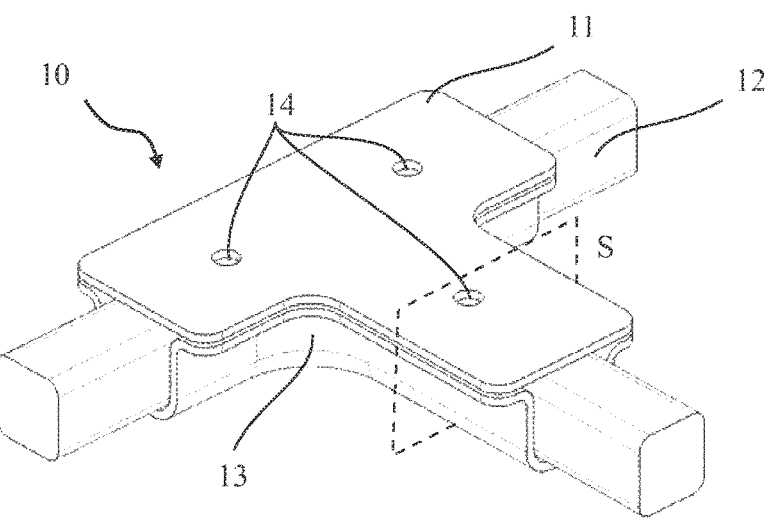
FIG. 2 shows a schematic representation of a perspective view of the assembly in the assembled state.

FIG. 1 shows an exploded representation of an assembly 10. The assembly 10 includes a first component 11, a second component 12 and a third component 13, all of which are realized in a substantially T-shaped manner. The first component 11 is realized as a flat, thin-walled metal plate in which three breakthroughs 14 are provided. The second component 12 is realized from square profiles which are here realized, for example, as solid material. Obviously, in alternative forms, the profiles of the second component 12 can also be realized in a hollow manner. The second component 12 also includes three breakthroughs 15 which are pushed through the component 12 completely, from a surface of the component 12, which faces the first component 11, to a surface of the component 12, which is not visible in FIG. 1 and which faces the third component 13. The third component 13 is realized in monocoque construction, as an example with a U-shaped cross sectional profile. In a first method step for producing the assembly, the individual components 11, 12 and 13 are aligned with respect to one another. In this case, the second component 12 is inserted into the profiled indentation of the third component 13 and covered by the first component 11. The intermediate assembly 10 which is created in this case is shown in FIG. 2. The intermediate assembly 10 is a preliminary step of the assembly 10' and differs from the assembly in that components 11, 12, 13 are not yet bonded together. The breakthroughs 14, 15 are shown, as an example, as through-bores, it also being possible for them to comprise other cross-sectional forms in special embodiments of the invention.

The further method steps for producing the finished assembly 10' are shown in FIGS. 3a to 3f. The Figures correspond to a sectional representation through the intermediate assembly 10 from FIG. 2 along the cutting plane S. As can be seen from FIG. 3a, the breakthrough 14 of the first component 11 and the breakthrough 15 of the second component 12 are aligned flush with one another. A cavity 30 is realized between the components 11, 12, 13 in the intermediate assembly 10.

Figures 3A, 3B:
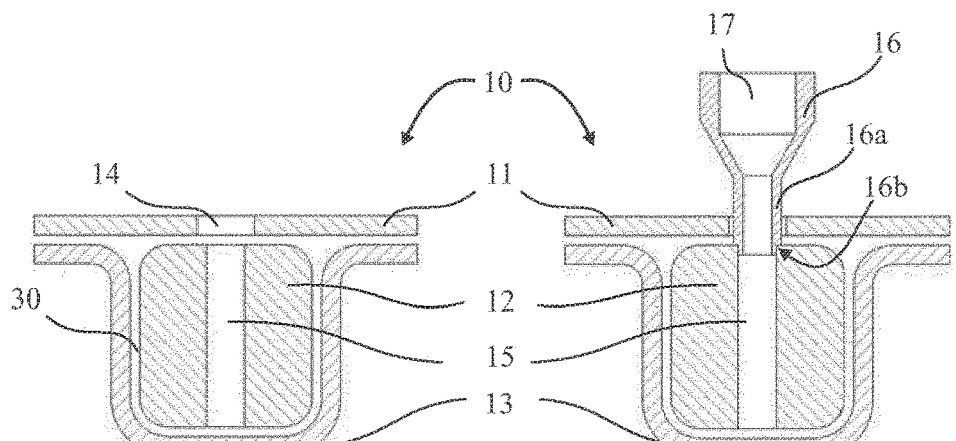
FIGS. 3a to 3f show individual method steps for producing the assembly.

In a following method step, a first injector 16 or a first nozzle 16 is placed onto the intermediate assembly 10. The nozzle 16 includes an outlet channel 16a through which an injector channel 17 extends. The outlet channel 16a can be guided through the opening or through the breakthrough 14 of the first component 11 and placed onto the second component 12. In this case, the outlet 16a closes off in a substantially flush manner with an inlet opening of the breakthrough 15 in the second component 12. In an advantageous manner, the inlet channel 16a, as shown in FIG. 3b, can include, at its frontmost end, a shoulder 16b, the outside diameter of which corresponds substantially to the inside diameter of the breakthrough 15. As a result, the outlet channel 16a can project slightly into the breakthrough 15 and the injection channel 17 is able to be sealed well in relation to the second region of the cavity 30.

Figures 3C, 3D:
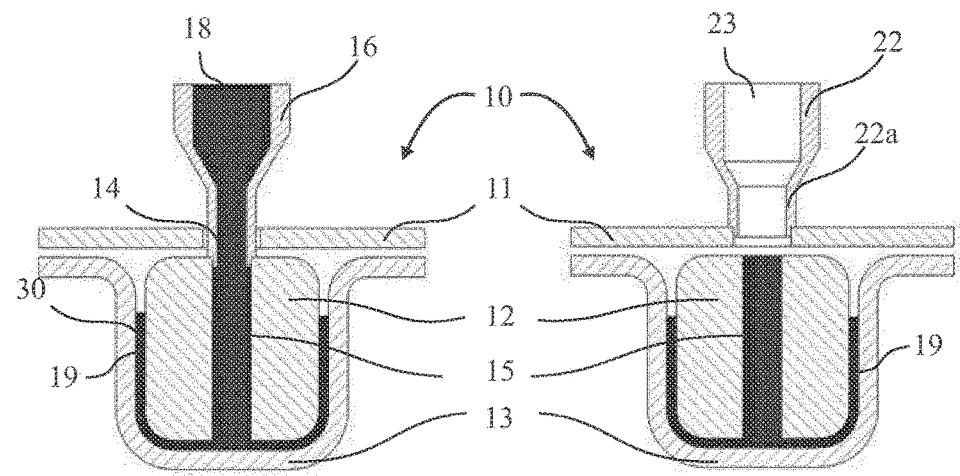

Once the first injector 16 has been placed in position, an adhesive compound or an adhesive, in particular a two-component adhesive, is injected via the injector channel 17 of the first injector 16. The adhesive, in this case, flows through the outlet 16a, into the breakthrough 15, traverses the breakthrough 15 and fills a first region 19 of the cavity 30. The method step is shown in FIG. 3c. As can be seen from this, the adhesive flows from a figuratively top side into the breakthrough 15 and out at the bottom side of the breakthrough 15, filling the bottom region of the cavity 30 and climbing up at the side in the gap of the cavity between the component 12 and the component 13. Consequently, the first adhesive layer or the first adhesive connection 19 is produced. The adhesive connection 19 shown in FIGS. 3c and 3d is situated in the first region of the cavity 30 such that the reference numeral 19 essentially designates the first region of the cavity 30. Once the first adhesive layer 19 has been produced, the first injector 16 is removed from the intermediate assembly 10.

Figures 3E, 3F:
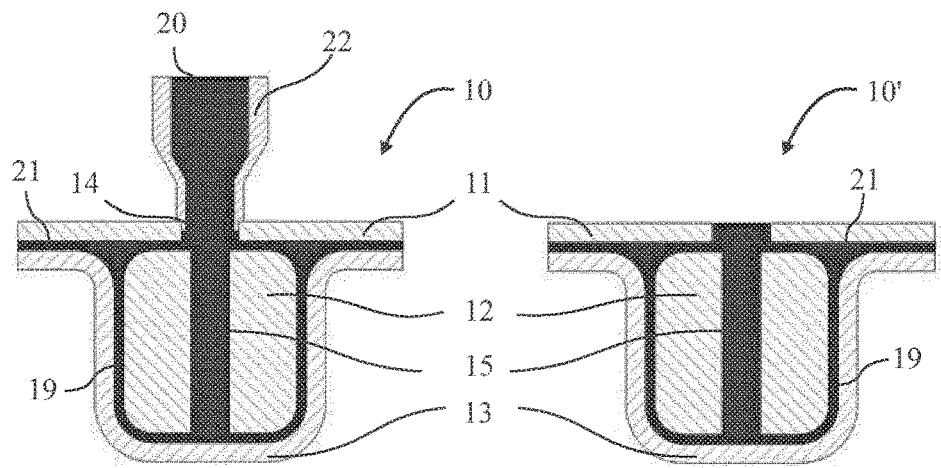

A second injector 22 is then placed, as shown in FIG. 3d, on the intermediate assembly. The second injector has an injector outlet channel 22a which is aligned substantially flush with the breakthrough 14 of the first component 11. Analogously to the first injector 16, the frontmost end of the outlet channel 22a of the second injector 22 also advantageously includes a shoulder, the outside diameter of which corresponds substantially to the inside diameter of the breakthrough 14 in the first component. As a result, a positioning can be realized where the shoulder positions the second injector 22 centrally in the first component 11 and at the same time achieves a good seal in relation to the surrounding area. A second adhesive layer 21 or a second adhesive connection 21 is then produced, as shown in FIG. 3e, with the second injector 22 or with a second nozzle. In this case, adhesive 20 is injected via the injector channel 23 of the second injector through the outlet 22a of the second injector 22. The adhesive compound penetrates into the region between the first component 11 and the second component 12 and thus fills a second region 21 of the cavity 30. As already described above with reference to the first adhesive connection 19, the second adhesive connection 21 fills a second region 21 of the cavity 30. Consequently, the reference sign 21 quantifies both the second adhesive connection, and also substantially the second region of the cavity 30.

Once the second injector 22 has been removed from the intermediate assembly 10, the assembly 10' is finished, the adhesive layers 19 and 21 being hardened. The end product of the method is shown in FIG. 3f.

It is consequently possible to realize a two-step bonding method according to the invention, in a first step an adhesive being injected with a small nozzle 16 through the inner, second component 12 into a first region 19 of the cavity 30, which is located on a remote side of the application point of the nozzle 16. In a second step, the adhesive is injected with a larger nozzle 22 into a second region 21 of the cavity 30, the second region 21 of the cavity 30 facing the larger nozzle 22. Different or identical adhesive can be used to produce the first adhesive layer 19 and the second adhesive layer 21. In a preferred manner, the second adhesive layer 21 is injected inside the cure time of the first adhesive layer 19 such that good adhesion to the first adhesive layer 19 can also be obtained. The method presents advantages to the effect that air inclusions can be avoided by an adhesive layer being produced first of all on a remote side of the second component 12 and then an adhesive layer on the facing side of the component 12.

Over and above this, it is also possible to work with low injection pressures. In addition, the method provides the advantage that only one-sided access to a side of the intermediate assembly 10 is required. This is a substantial advantage in body construction as the injection robot, i.e., the robot arm which moves the adhesive feeding device 16, 22, only requires access on one side of the body.

In a further embodiment of the method (not shown), the small injection nozzle 16 and the large injection nozzle 22 can be realized as one single tool. To this end, the injector nozzles 16, 22 are aligned in a coaxial manner, the small injector nozzle 16 being inserted substantially in the outlet channel 22a of the large injector nozzle 22. The injector nozzles 16, 22, in this case, can be displaceable in a translatory manner with respect to one another, along their longitudinal axis or along the direction of flow of the adhesive. To fill the cavity 30 with adhesive, analogously to the method described in FIGS. 3a to 3f, a first adhesive layer 19 is consequently produced, as a result of injecting adhesive via the first injection nozzle 16. The injection nozzle 16 is then retracted into the interior of the injection nozzle 22. The outlet channel 16a of the first injector 16, in this case, only has to be pulled back by an amount that allows the second injector 22 to be placed in a process-reliable manner onto the first component 11. The second adhesive layer 21 is then produced by the second region 21 of the cavity 30 being filled with adhesive.

In a further embodiment which is not shown figuratively, the assembly only includes two components. The design of such an assembly, in this case, corresponds to the assembly shown in FIGS. 1, 2 and 3, the first component 11 and the third component 13 being realized in one piece, i.e., integrally, and being designated below as the first component. The second component, in this case, corresponds to the component 12 from the Figures. The first component includes a first portion which corresponds substantially to the form and the position of the third component 13 in FIGS. 1 to 3. Over and above this, the first component includes a second portion which corresponds in its position and its form substantially to the first component 11 from the Figures. To produce such an assembly, an intermediate assembly, produced from the first component and the second component, is produced first of all, the components being arranged in a predetermined position with respect to one another. In the embodiment, the second component is surrounded by the first component in the circumferential direction. An assembly analogous to FIGS. 1 and 2 is consequently not possible. Instead, the second component is slid into the first component until it reaches a predetermined position. In the position, one or multiple breakthroughs 15 in the second component are aligned in a flush manner to one or multiple breakthroughs 14 in the first component.

Analogously to the above-described embodiment, a first adhesive connection is also produced here between a first portion of the first component and the second component. When the adhesive is applied by way of an injector 16 on one side of the second component 12, a first adhesive connection is thus produced on the oppositely situated side of the component 12. Also analogously to the above-described embodiment, a second adhesive connection is produced between a second portion of the first component and the second component 12. The adhesive connection is then located on a side of the component 12 which faces the injector 22.

All the embodiments described previously provide the advantage of a short cycle time or a high cycle frequency. The bonding method is suitable in particular in the case of components produced from fiber-reinforced plastics materials, for example glass fiber-reinforced plastics material components or carbon fiber-reinforced plastics material components. The reinforcing fibers can be organic or inorganic reinforcing fibers. The reinforcing fibers can be, for example, carbon fibers. With the plastics material matrix, they form a carbon fiber-reinforced plastics material, also called CFRP (carbon fiber reinforced plastic). The associated FRP component is then a CFRP component. The reinforcement fibers can also be, for example, glass fibers. With the plastics material matrix, they form a glass fiber-reinforced plastics material, also called GFRP. The associated FRP component is then a GFRP component. However, the invention is not limited to this, and the reinforcing fibers can also be aramid fibers, polyester fibers, nylon fibers, polyethylene fibers, PMMA fibers, basalt fibers, boron fibers, ceramic fibers, silicic acid fibers, steel fibers and/or natural fibers, for example. Recycling fibers. The material of the plastics material matrix may comprise, in particular, one or multiple thermoplastic materials (thermoplastics) and/or thermosetting materials (thermosetting plastics). The advantage of fiber-reinforced plastics materials with a thermoplastic matrix is that they can be reshaped or welded retrospectively. Suitable as thermoplastic materials are: polyether ether ketone (PEEK), polyphenylene sulfide (PPS), polysulfide (PSU), polyetherimide (PEI) and/or polytetrafluoroethylene (PTFE). Fiber-reinforced plastics materials with a thermosetting matrix can no longer be reshaped after curing or integrating the matrix. In an advantageous manner, they comprise a high operating temperature range. This applies, in particular, to hot-curing systems which are cured under high temperatures. Fiber-reinforced plastics materials with a thermosetting matrix comprise the highest strengths in the majority of cases. The following resins can be used, for example, as thermosetting materials or matrix: epoxy resin (EP), unsaturated polyester resin (UP), vinyl ester resin (VE), phenol formaldehyde resin (PF), diallyl phthalate resin (DAP), methacrylate resin (MMA), polyurethane (PUR), amino resins, melamine resin (MF/MP) and/or urea resin (UF). The method can obviously also be used for bonding components produced from other materials. The bonding method provides advantages to the effect that a good material mix can be realized in the intermediate assembly, it being possible to bond together components produced from wood, metal, ceramic and/or plastics material.

Adhesive has been described above as a material for producing an adhesive connection. In the case of the adhesive connections, the components to be connected are connected together as a result of adhesion. In terms of the invention, however, casting compounds are also subsumed under the term adhesive. Such casting compounds are also introduced into the cavity in liquid or dough-like form. Once the casting compound has been hardened, there is a positive locking connection between the components. Adhesion forces, in this case, play a subordinate role.

LIST OF REFERENCE CHARACTERS

10 Assembly
11 First component
12 Second component
13 Third component
14 Breakthrough of the first component
15 Breakthrough of the second component
16 First injector
17 Injector channel of the first injector
18 First adhesive
19 First adhesive layer
20 Second adhesive
21 Second adhesive layer
22 Second injector
23 Injector channel of the second injector The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an assembly, wherein the assembly includes at least three components, comprising the acts of:

producing an intermediate assembly from a first component, a second component, and a third component, wherein the first, second, and third components are arranged in a predetermined position with respect to one another;

producing a first adhesive connection in a first region between the second component and the third component; and producing a second adhesive connection in a second region between the first component and the second component;

wherein the producing the first adhesive connection in the first region includes:

inserting an outlet channel of a first nozzle through a first breakthrough in the first component and inserting a shoulder of the outlet channel into a first end of a second breakthrough in the second component such that an injection channel of the first nozzle is sealed off from the second region;

injecting an adhesive through the injection channel and flowing the adhesive from the first end of the second breakthrough through the second breakthrough to a second end of the second breakthrough and into the first region such that the adhesive flows in the first region in a direction from the second end of the second breakthrough to the first end of the second breakthrough; and removing the first nozzle from the intermediate assembly;

wherein the producing the second adhesive connection in the second region includes:

inserting a second nozzle into the first breakthrough in the first component;

injecting the adhesive into the first region by the second nozzle; and removing the second nozzle from the intermediate assembly;

wherein the first adhesive connection is produced and then the second adhesive connection is produced.

* * * * *